June 12, 1934.  D. W. VOORHEES, JR  1,962,539
TRACTOR ATTACHMENT MECHANISM
Filed Jan. 9, 1932  3 Sheets-Sheet 1
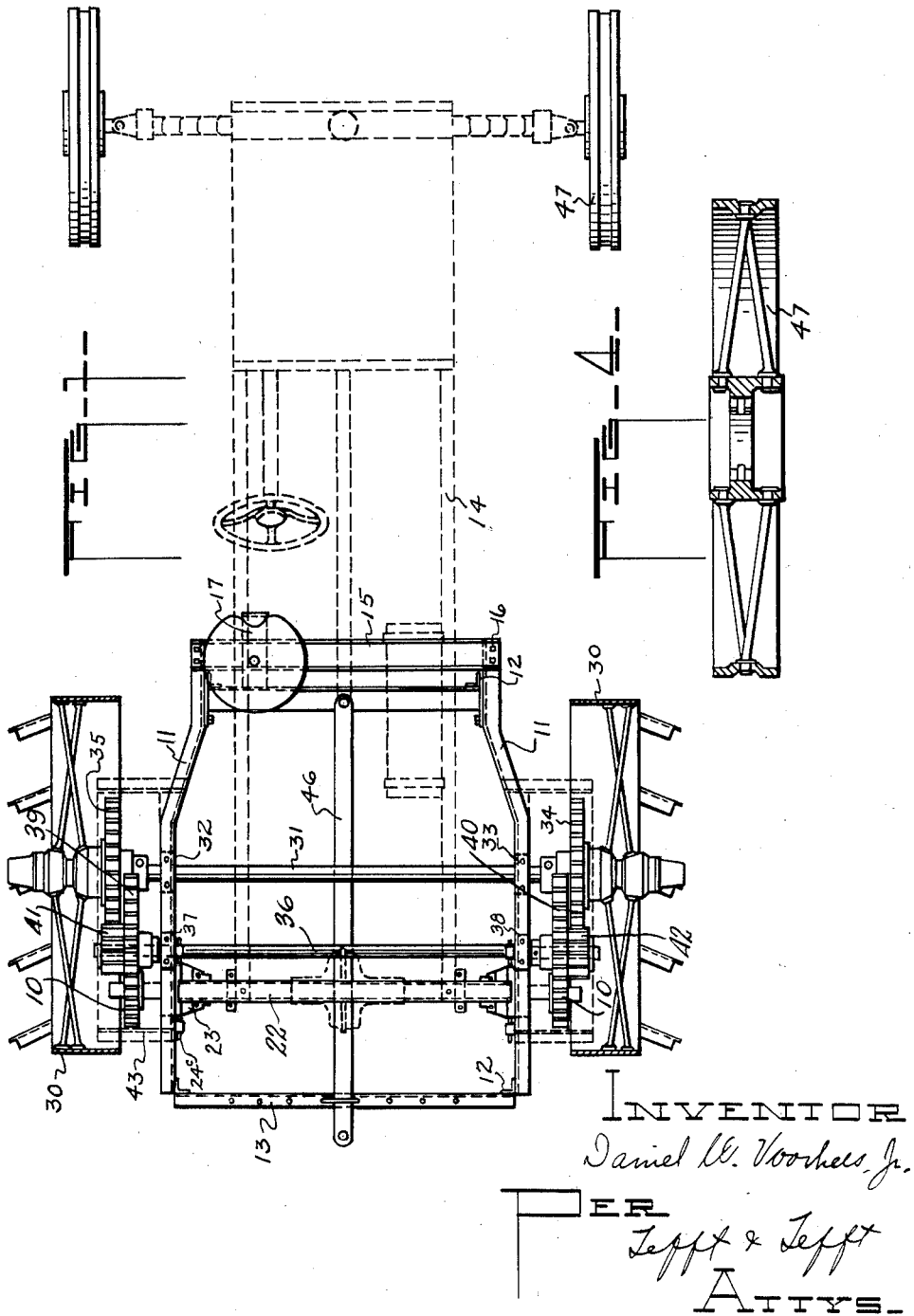
INVENTOR
Daniel W. Voorhees, Jr.
PER
Tefft & Tefft
ATTYS.

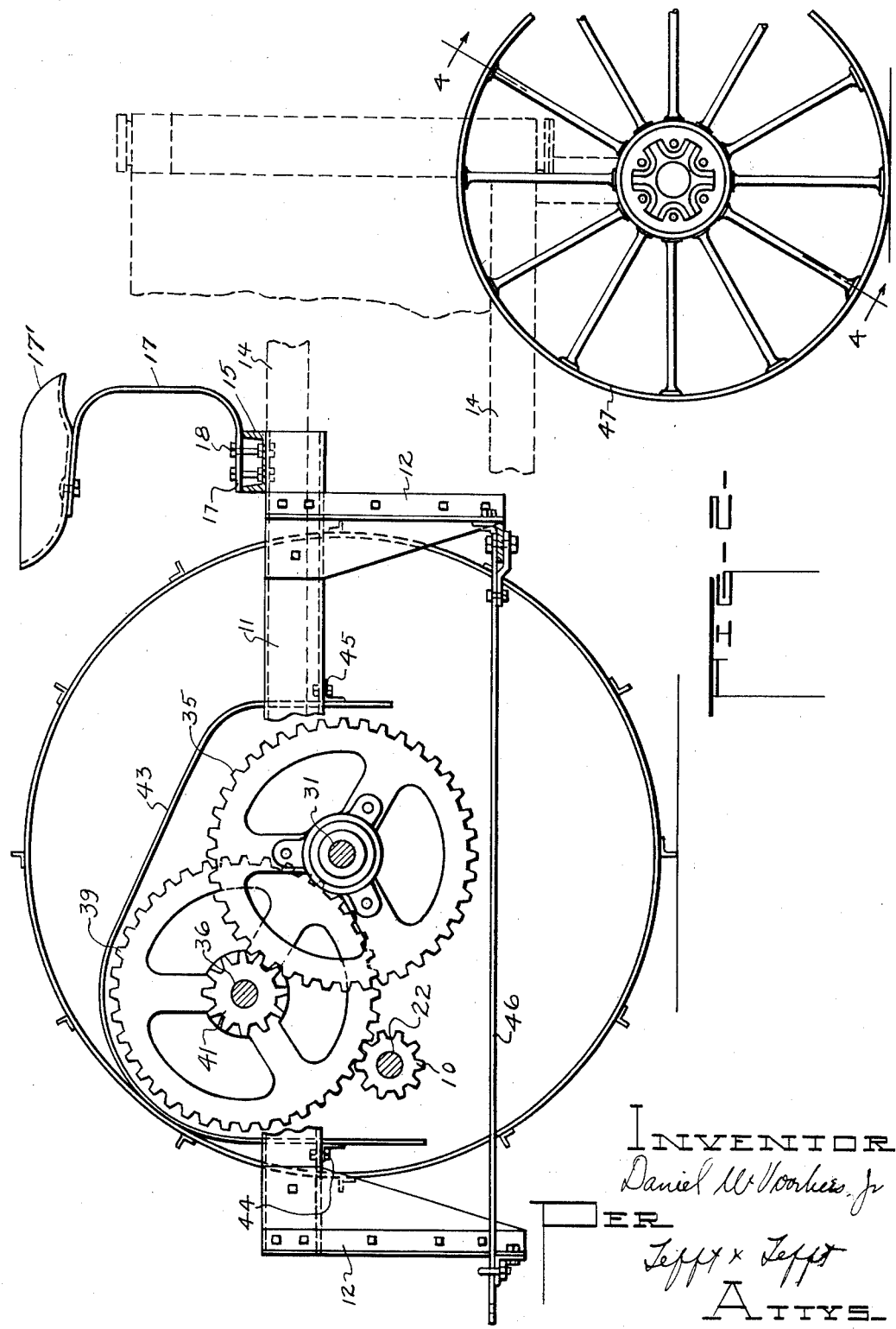

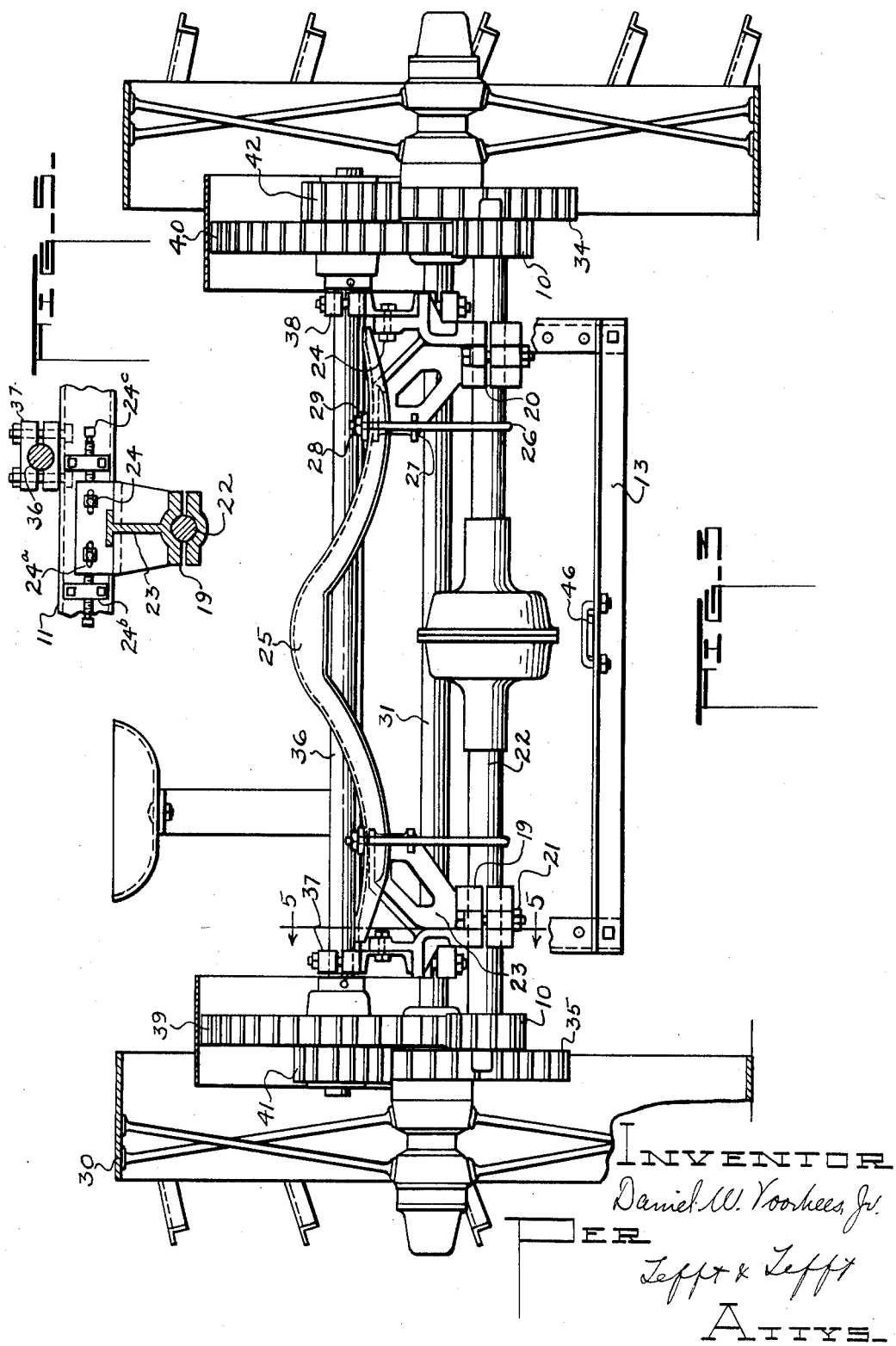

Patented June 12, 1934

1,962,539

UNITED STATES PATENT OFFICE 1,962,539

TRACTOR ATTACHMENT MECHANISM

Daniel W. Voorhees, Jr., Peru, Ill.

Application January 9, 1932, Serial No. 585,689

1 Claim. (Cl. 180—16)

This invention relates to tractor attachments for motor vehicles.

One of the objects of the invention is in the provision of a tractor mechanism capable of attachment to the ordinary motor vehicle when the body of same has been removed.

Another object lies in the provision of tractor attachment mechanism formed as a complete unit and in such manner as to permit attachment to the frame and driving portions of the ordinary pleasure type of motor vehicle when the body and rear drive wheels of same have been removed.

Still another object lies in the provision of a tractor attachment which comprises a frame so arranged as to be capable of quick attachment to the frame of the conventional motor vehicle, said frame being so arranged as to support tractor wheels and also to permit a driving engagement between the rear axle of the conventional motor vehicle and the tractor wheels, such driving engagement being through a series of gears so arranged as to render impossible any collection of dirt or extraneous matter therein, as well as to permit a smooth driving arrangement.

A further object lies in the provision of tractor attachment mechanism including a sturdy frame supporting tractor wheels thereon, said frame being arranged for relatively quick attachment to the frame and rear portion of a conventional motor vehicle from which the body has been removed, the final driving connection to the tractor wheels being accomplished through a novel arrangement of gears connecting the axle of the motor vehicle and the tractor wheels, such arrangement of gears permitting the use of large driving teeth as well as operating to elevate the driving mechanism sufficiently high to prevent any possible accumulation of dirt or other extraneous matter between the driving teeth.

Other objects will appear in the following specification, taken in connection with the annexed drawings, in which Fig. 1 is a plan view of my tractor attachment;

Fig. 2 is a side elevational view thereof;

Fig. 3 is a rear elevation thereof;

Fig. 4 is a detail showing of the character of tractor steering wheel which is used for the forward portion of the motor vehicle; and Fig. 5 is a fragmentary view, showing the manner of adjustably attaching one of the tractor attachment portions.

Before referring specifically to the drawings for a detail description of applicant's tractor attachment mechanism, it might be stated that applicant has developed the present mechanism for use by the farmer, who either has not sufficient acreage to merit the purchase of an expensive tractor mechanism, or in other instances, by that larger group of farmers who are unable to afford power equipment.

From a cursory consideration of the drawings, it may be readily seen that applicant's tractor attachment mechanism is designed for use in connection with motor vehicles of the conventional type, in other words, practically every farmer has a motor vehicle of one character or another. When this motor vehicle has been used to such an extent as to render its re-sale value at an extremely low figure, the farmer may, by purchasing applicant's tractor attachment mechanism, greatly increase the life of said vehicle by using it as the power element of a tractor which may be created by combining his old car with attachment tractor mechanism of the character manufactured and sold and here presented by the present applicant. Further, this tractor formed by the combination of an old motor vehicle and applicant's tractor attachment mechanism, may be built at a very low price, the resulting tractor mechanism, however, being suitable in every way for use on the ordinary farm.

A further feature of importance in a device of the character herein disclosed is that same is so constructed, as will be later pointed out in detail, that the farmer may himself attach this tractor mechanism to his conventional motor vehicle, such connection being made with the ordinary tools with which the farmer is so well acquainted and uses so often on the farm. It is quite obvious that the farmer may use his spare time to build up this character of tractor.

In the various figures of the drawings, it will be seen that the conventional type of motor vehicle has been shown in almost every instance in dotted lines. The motor vehicle has been shown in this manner in that the present tractor attachment is sufficiently flexible, as far as various parts are concerned, to permit its attachment to practically any type of conventional motor vehicle with which the farmer is acquainted. Obviously, this tractor attachment is ordinarily applied to a conventional motor vehicle and such machine has been shown in the drawings. Further, it is apparent that the conventional motor vehicle has been stripped of the body portion and rear driving wheels and further, that to the driving hubs of the rear axle driving gears 10 have been securely fixed thereon.

Now, as far as the tractor attachment mechanism is concerned a heavy frame is built up of the side framing portions 11, the downwardly depending end pieces 12 and the rear draw bar supporting frame 13. The two side frames 11 are bent inwardly, as shown perhaps most clearly in Fig. 1 of the drawings, in a manner to form attachment portions with the conventional motor vehicle frame 14. This connection is made by using the dual cross connecting members 15, which are connected above and below the frame 14 and securely bolted together, as at 16, in a manner to securely strap the front end of the tractor attachment mechanism to the frame 14 of the motor vehicle.

A seat 17' is supported upon the cross connecting member 15 by means of an upright member 17 secured to member 15 by bolts 18.

It is apparent that the motor vehicle frame is disposed between the tractor frames 11 and that the rear axle and drive shaft are disposed below the frame, with the driving pinions 10 secured to the axle in a manner to permit engagement, as will be later described, with the driving means for the tractor wheels.

The rear portion of the motor vehicle frame and the rear axle are connected to the tractor attachment mechanism in the following manner: Heavy dual brackets 19 are clamped at 20 and securely bolted as at 21 to the vehicle axle 22. These clamps have the upwardly depending portions 23 forming an integral part thereof, bolted as at 24 to the side frames 11 of the tractor attachment mechanism.

Mechanism for attaching the portions 23 to the frames 11 in an adjustable manner is shown in Fig. 5 of the drawings, wherein it will be seen that slots 24a are provided in the side frame, through which attachment bolts 24 project. By means of the slots 24a and attachment bolts 24 a slidable clamp connection is provided between the motor vehicle frame and attachment frame structure. Upon either side of this casting 23 are dual brackets 24b bolted to the side frame and into these brackets are threaded plural adjusting screws 24c. It is apparent that this adjustment of the before mentioned bracket members permits a degree of adjustment of the later to be described driving mechanism.

The upwardly and inwardly projecting brackets 19 previously described, are received in the conventional spring housing member 25, which in turn forms the rear support and securement portion for the conventional motor vehicle frame.

The securing of the dual brackets 19, conventional spring housing member 25 and rear driving axle 22 in a fixed and immovable manner is accomplished by means of the dual U-shaped attachment clips 26. It is obvious that these clips have their U-shaped portions surrounding the axle and that intermediate their length they are received in notches 27 formed in brackets 19 and that they are finally bolted as at 28 to the cross pieces 29.

It will now be seen that the tractor attachment frame is attached securely to an intermediate portion of the conventional motor vehicle frame, and further, that same is fixedly connected not only to the rear portion of the vehicle frame but also to the conventional driving axle thereof.

The evident difference in motor vehicle construction is the fact that the ordinary spring construction has been removed and the axle is held in an immovable position with respect to the tractor attachment mechanism.

Now, turning to the method of accomplishing the drive between the driving pinions 10 on the conventional axle and the tractor wheels, in the first place, heavy tractor wheels 30 are disposed upon the hubs of a shaft or axle 31. This shaft 31 finds its bearing supports at 32 and 33 in the side frames 11. Connected to the tractor wheels in a direct driving relationship therewith are the dual driving gears 34 and 35. These gears obviously constitute the final driving connection with the tractor wheels and we now turn to the intermediate driving connections between the driving pinions 10 and these before mentioned gears 34 and 35.

A jack shaft 36 finds suitable bearing supports 37 and 38 in the side frames 11, said jack shaft lying in an overhead relationship with respect to the frame and the same carrying in a rotating and driving relationship upon its extended hub portions the larger set of gears 39 and 40 and the smaller pinions 41 and 42. It is quite apparent from viewing the elevational view in Fig. 2 that pinions 41 and 42 are driven simultaneously with gears 39 and 40, that they are speed reduction members, and that further, and finally, they mesh with the before mentioned gears 34 and 35, which in turn are connected to the tractor wheels.

It is further apparent that the driving pinions 10 mesh with gears 39 and 40, which in turn, as previously described, are disposed upon the ends of the jack shaft 36.

In Fig. 2 of the drawings it will also be seen that by such arrangement of driving connections a simple cover mechanism 43 may be attached as at 44 and 45 to the side frames 11 in a manner to house completely the driving mechanism. It will further be noted that by arranging the driving gears for the tractor wheels in the manner herein disclosed, same are elevated a sufficient height from the ground as to obviate absolutely any possibility of earth or other extraneous matter gathering between the driving teeth.

Experience in this character of device and as a matter of fact, the prior art, will show many attempts in driving means for tractor attachment mechanism to get away from the accumulation of earth and extraneous matter in the driving connections.

Tractor attachment mechanisms heretofore known have always utilized a large driving gear secured to the tractor wheel in a position adjacent the periphery thereof and a small driving pinion has been meshed with said large gear for the purpose of driving same. Such character of drive for this type of device always results in the accumulation of earth in the driving connections and renders same impractical.

Applicant, further realizing that such an arrangement of parts makes impossible the use of large gear teeth in the driving mechanism, has so arranged his gear mechanism as to permit the use of more driving teeth and larger ones throughout his mechanism. This arrangement of driving parts results in a smooth drive for the tractor attachment and thus overcomes the main disadvantage which has heretofore attended the use of such minimum priced tractor mechanism in other ways entirely satisfactory.

Further, it might be noted that by utilizing such arrangement of driving mechanism a tractor attachment of less weight results.

Attention is called in the drawings to a drawbar member 46 which is secured to the frame in such manner as to permit connection with any character of vehicle that may be drawn by the tractor.

As far as operation of my tractor attachment mechanism is concerned, it is thought clear that same is actually constructed as a separate unit, comprising a sturdy frame portion, tractor wheels, and driving mechanism for the tractor wheels in which a jack shaft and novel arrangement of gears is used. These gears all have large teeth of the same size and are adapted when finally connected with driving pinions secured to the ends of the conventional motor vehicle driving axle, to furnish a smooth flow of power from said axle to the tractor wheels. Obviously, the driving mechanism is elevated to a point where any possibility of accumulation of extraneous matter is obviated. Further, the driving mechanism may be readily covered in the manner herein shown. Securement of the tractor attachment herein shown to the motor vehicle is accomplished by strapping the front end of the sturdy frame to the intermediate portion of the motor vehicle. The rear connection is made by fastening the rear axle of the motor vehicle and the spring housing portion in a fixed manner to heavy brackets, which in turn are connected to the tractor attachment frame. Thus, it will be seen that the motor vehicle frame and also the frame of the tractor portion are secured in an absolutely immovable manner.

It is obvious that detachment of the conventional forward steering wheels of the motor vehicle is necessary and replacement thereof with smaller tractor steering wheels of the type designated 47 and of the well known type shown in Fig. 4.

What I claim is:

Tractor attachment mechanism for conventional motor vehicles including a frame structure adjustably secured to a vehicle frame and rear axle thereof, a transverse shaft having tractor wheels and gears mounted thereon rotatably supported upon said frame structure, a jack shaft also mounted upon the frame structure carrying gears meshing with the first named gears, pinions secured to the rear axle of the motor vehicle meshing with the second named gears whereby a driving relationship is provided between the vehicle rear axle and said tractor wheels, means for adjustably securing the said frame structure to the motor vehicle frame and rear axle including slidable clamp connection between the motor vehicle frame and said attachment frame structure, plural bracket members adjustably secured to the frame structure having clamp connection at their lower ends with said rear axle and means for accomplishing lateral adjustment of the brackets on the frame structure comprising plural oppositely disposed adjustment screws supported upon the frame structure and operable, when rotated, to accomplish lateral movement of said brackets relative to the frame structure and said jack shaft.

DANIEL W. VOORHEES, Jr.